(12) United States Patent
Line et al.

(10) Patent No.: US 8,556,346 B2
(45) Date of Patent: Oct. 15, 2013

(54) VEHICLE SEAT WITH ROTATING ANGLE ADJUSTMENT

(75) Inventors: Johnathan Andrew Line, Northville, MI (US); John W. Jaranson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 12/916,812

(22) Filed: Nov. 1, 2010

(65) Prior Publication Data

US 2012/0104819 A1    May 3, 2012

(51) Int. Cl.
  *B60N 2/10*    (2006.01)
(52) U.S. Cl.
  USPC ........................................................ 297/327
(58) Field of Classification Search
  USPC .................. 297/325, 329, 216.19, 216.2, 327, 297/378.1, 354.12
  See application file for complete search history.

(56) References Cited

U.S. PATENT DOCUMENTS

| | | | |
|---|---|---|---|
| 4,355,778 A | | 10/1982 | Hess et al. |
| 5,244,252 A | * | 9/1993 | Serber ...................... 297/216.19 |
| 5,366,269 A | * | 11/1994 | Beauvais ................. 297/216.19 |
| 5,437,494 A | * | 8/1995 | Beauvais ................. 297/216.19 |
| 5,449,218 A | * | 9/1995 | Beauvais et al. ......... 297/216.19 |
| 5,735,574 A | * | 4/1998 | Serber ........................ 297/284.4 |
| 6,776,454 B1 | | 8/2004 | Aubert et al. |
| 7,052,088 B2 | * | 5/2006 | Aramburu Echeverria .. 297/325 |
| 7,780,230 B2 | * | 8/2010 | Serber ...................... 297/216.15 |
| 2006/0138797 A1 | | 6/2006 | Wang et al. |

FOREIGN PATENT DOCUMENTS

| | | |
|---|---|---|
| EP | 1331130 A1 | 7/2003 |
| JP | 7315084 A | 12/1995 |

* cited by examiner

*Primary Examiner* — Milton Nelson, Jr.
(74) *Attorney, Agent, or Firm* — Vichit Chea; Brooks Kushman P.C.

(57) ABSTRACT

A vehicle seat is movable in a rocking or rotating fashion about a center-of-rotation located above a seat bottom. The seat bottom has forward and rear edges and a mounting structure for securing the seat bottom to a vehicle interior engaging the seat bottom to permit movement of the forward edge along a first arcuate path and movement of the rear edge along a second arcuate path. The two arcuate paths having a common center-of-curvature located above the seat bottom, the center-of-curvature defining the center-of-rotation of the seat. A seat back attached to the seat bottom is independently adjustable in recline angle relative to the seat bottom. The arcuate paths may be defined by forward and rear guide tracks formed in one or more seat mounting brackets. A rack-and-pinion drive mechanism is provided to allow manual or powered adjustment of the seat along the guide tracks.

18 Claims, 5 Drawing Sheets

VEHICLE SEAT WITH ROTATING ANGLE ADJUSTMENT

BACKGROUND

1. Technical Field

This invention relates to occupant seats for automotive vehicles and specifically to an occupant seat with a rotating angle adjustment.

2. Background Art

A primary goal in the design of automotive vehicle interiors is to achieve the most comfortable and safe seating positions for vehicle occupants having a wide range of body sizes and types. Many different types of adjustable seat mechanisms have been proposed to allow a seat occupant to vary one or more characteristics such as the seat height, forward/rear position, seat bottom angle, and seat back angle.

Limited space is available in the passenger compartments of most vehicles, and particularly in the rear seating rows. It would be desirable to provide a seat assembly that allows occupants the ability to adjust the tilt angle of the seat cushion and the seat back using a single control which provides a large range of motion to increase comfort and safety.

SUMMARY

In a disclosed embodiment a vehicle seat assembly comprises a seat bottom having forward and rear edges, a mounting structure for securing the seat bottom to a vehicle interior and engaging the seat bottom to permit movement of the forward edge along a first arcuate path and movement of the rear edge along a second arcuate path, the arcuate paths having a common center of curvature located above the seat bottom, and a seat back attached to the seat bottom for rotation about an axis adjacent the seat bottom rear edge. The seat bottom is movable relative to the mounting structure along the arcuate paths in a rocking or rotating manner, while the angle between the seat bottom and seat back is unaffected by the rocking movement.

In another disclosed embodiment a vehicle seat assembly comprises a seat bottom having a forward edge and a rear edge, and a mounting structure supporting the seat bottom adjacent the forward and rear edges. The mounting structure comprises a forward guide track movably engaging the forward edge of the seat bottom and a rear guide track movably engaging the rear edge of the seat bottom, the two guide tracks defining arcuate paths having a common center of curvature located above the seat bottom. The seat bottom is moveable along the two guide tracks simultaneously so as to achieve a rocking or rotating movement about the center of curvature.

In another disclosed embodiment a vehicle seat assembly comprises a seat bottom having a forward edge and a rear edge; a seat back attached to the seat bottom for rotation about an axis adjacent the seat bottom rear edge; a seat mounting structure for securing the seat bottom to a vehicle interior, the mounting structure comprising a forward guide track defining a first arcuate path and a rear guide track defining a second arcuate path; a forward follower attached to the seat bottom adjacent to the forward edge and engaging the forward guide track for movement there along; and a rear follower attached to the seat bottom adjacent the rear edge and engaging the rear guide track for movement there along, the first and second arcuate paths having a common center of curvature located above the seat bottom.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
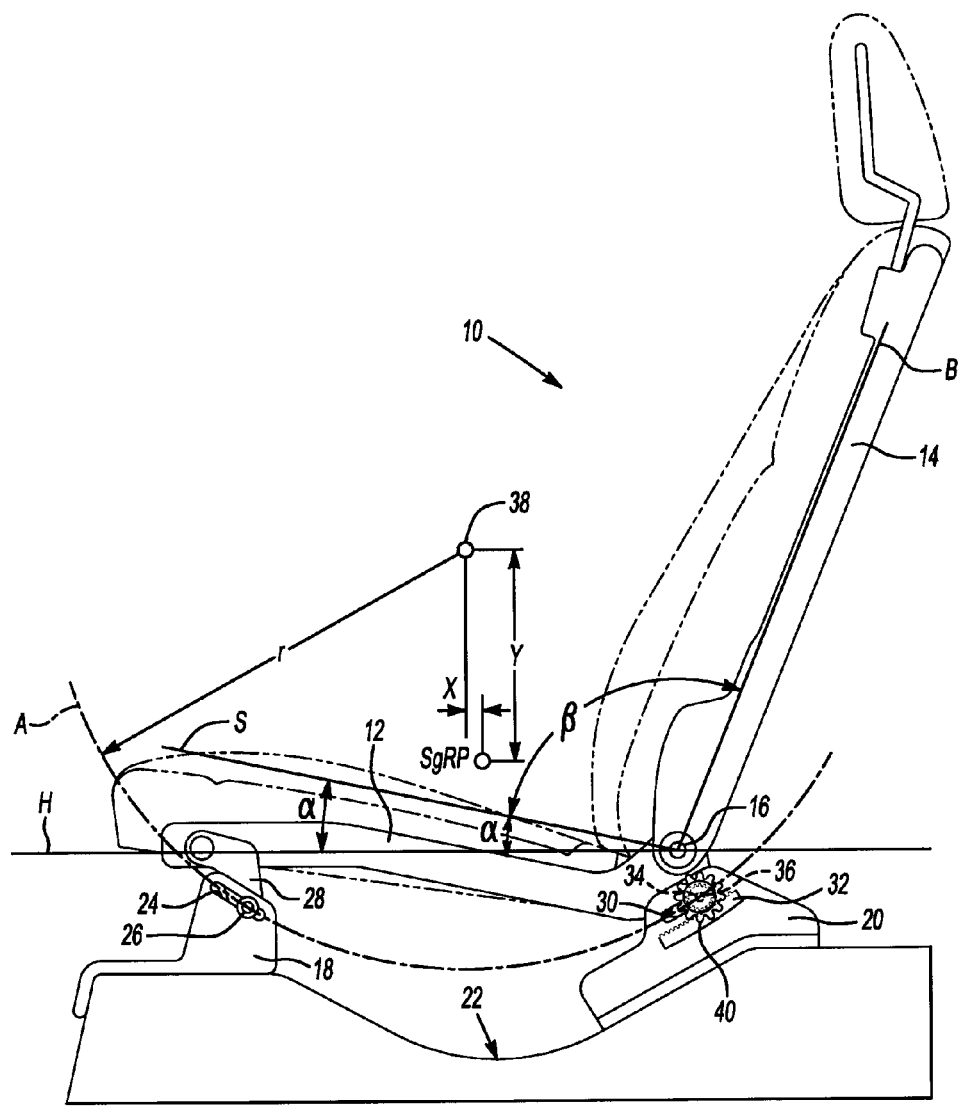
FIG. 1 is a schematic elevation view of a seat assembly installed in the passenger compartment of a vehicle.

Referring to FIG. 1, a seat assembly 10 is shown installed in an automotive vehicle passenger compartment and comprises a seat bottom 12 and a seat back 14 that is angularly movable relative to the seat bottom about a pivot axis 16. Reference numerals 12 and 14 indicate the primary, rigid structure of the seat bottom and seat back respectively, and the cushioned seating surfaces which the seat occupant actually contacts are shown in phantom lines.

A horizontal reference line is labeled as H. A seat bottom reference line is labeled as S and indicates a mean or assumed angle of the seat bottom structure. A seat back reference line is labeled as B and indicates a mean or assumed angle of the seat back structure. The angle between horizontal reference line H and seat bottom reference line S is identified as u, and is variable in a manner to be described below. The angle between seat back reference line B and seat bottom reference line S is identified as 13, and may be varied by a seat occupant (not shown) using a manually operated control such as a knob or lever (not shown) or a powered mechanism (not shown) in a manner that is well known in the art.

Seat assembly 10 further comprises a mounting structure comprising a forward bracket 18 and a rear bracket 20 for mounting the seat to a vehicle interior structure 22. Forward bracket 18 includes an arc-shaped, slot-like guide track 24 that receives a follower 26 attached to seat bottom 12 adjacent a forward edge thereof. In the embodiment shown in FIG. 1, follower 26 is a pin, rod, tube or other component attached to a link 28 that is pivotingly attached to seat bottom 12. Link 28 may be provided to allow seat assembly 10 to be folded forward to a stowed position (not shown) in the event that the seat and vehicle interior are designed for such reconfiguration.

Rear bracket 20 includes an arc-shaped rear guide track or slot 30 and a toothed rack 32 disposed just below the slot. A rear follower 34 is attached to seat bottom 12 adjacent the rear edge thereof and engages the rear slot 30. A pinion gear 36 is attached to rear follower 34 and/or seat bottom 12 so that the teeth of the pinion engage rack 32 as the follower rides in slot 30. An adjustment wheel or knob 40 may be rotated by a seat occupant to rotate pinion 36. Knob 40 is show as coaxial with and directly connected to pinion 36, but the two may be mechanically interconnected in any appropriate fashion.

Forward and rear slots 24, 30 define arc-shaped paths along which the respective followers 26, 34 simultaneously travel.

This travel results in a rotating or rocking movement of seat assembly 10 and a consequent change in angle α. Because both followers are located on seat bottom 12, adjustments or changes to angle α may be made with no resulting change in angle β.

Figure 5:
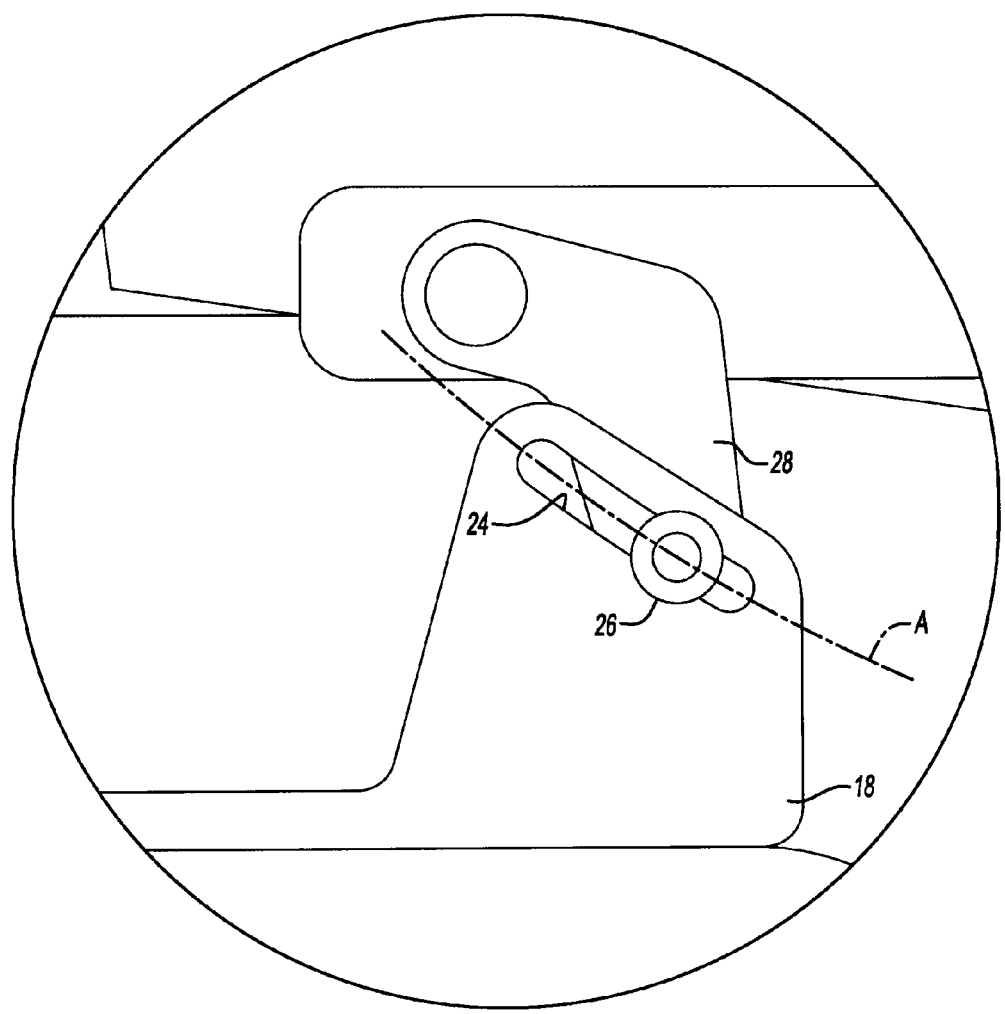
FIG. 5 is a detailed schematic view of a portion of the seat assembly in the Vicinity of the forward bracket.

The forward and rear arc-shaped paths 24, 30 follow a common arc A having a center-of-curvature 38 located above seat bottom 12. The arc A defines the respective centerlines of arc-shaped paths 24, 30 as is moer clearly shown in the enlarged views of FIGS. 3 and 5. Center-of-curvature 38 may also be located above a seating reference position (SgRP) associated with the seat assembly 10. The SgRP is a theoretical location of a seat occupant's hip point used by vehicle manufacturers, the Society of Automotive Engineers, the U.S. Department of Transportation, and other industry groups to express various seating measurements and characteristics (such as leg room) that are pertinent to seating comfort, vehicle entry and exit, interior packaging, restraint design, collision performance, and visibility from the vehicle.

The relative locations of center-of-curvature 38, seat assembly 10, and the SGRP may be expressed by the dimensions indicated on FIG. 1 as X, Y, and r. These dimensions may be varied as desired to fit a seat assembly of a given size and configuration into the available passenger compartment space and to provide the desired amount of adjustment in the recline angle of the seat.

Figure 2:
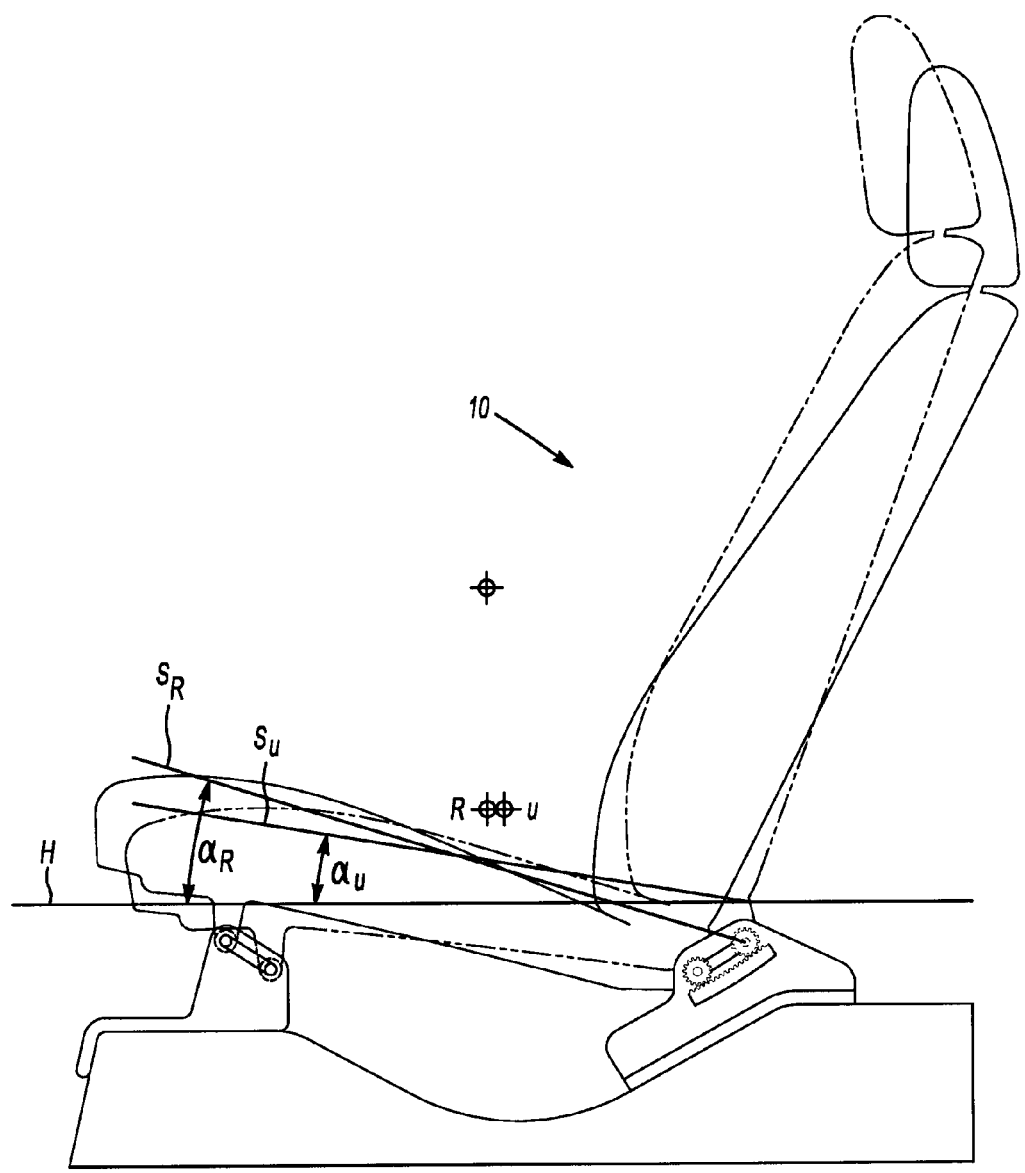
FIG. 2 is a schematic elevation view showing a range of adjustment positions of the seat assembly in FIG. 1.

FIG. 2 compares the position of seat assembly 10 in a fully reclined position (shown in solid lines) and a fully upright position (shown in phantom lines). The range of motion for a particular seat assembly depends on the usable lengths of the arcuate paths defined by slots 24, 30.

Seat assembly 10 may by infinitely adjustable between the two extreme positions, or a number of discrete positions may be provided. Seat assembly 10 rocks or rotates about center-or-curvature 38 between the two positions without any related change in the angle β between seat bottom 12 and seat back 14. When in the upright position, seat bottom reference line $S_U$ is oriented at an angle $α_U$ relative to horizontal reference line H. When in the reclined position, seat bottom reference line $S_R$ is oriented at an angle $α_R$ relative to horizontal reference line H.

With the relative dimensions as shown in FIGS. 1 and 2, the SgRP moves a small amount when the seat moves between fully upright and fully reclined positions, as indicated by the two SgRP points indicated as U and R.

The embodiment shown in FIG. 2 differs from that of FIG. 1 in that there is no pivoting link between seat bottom 12 and front bracket 26.

Figure 3:
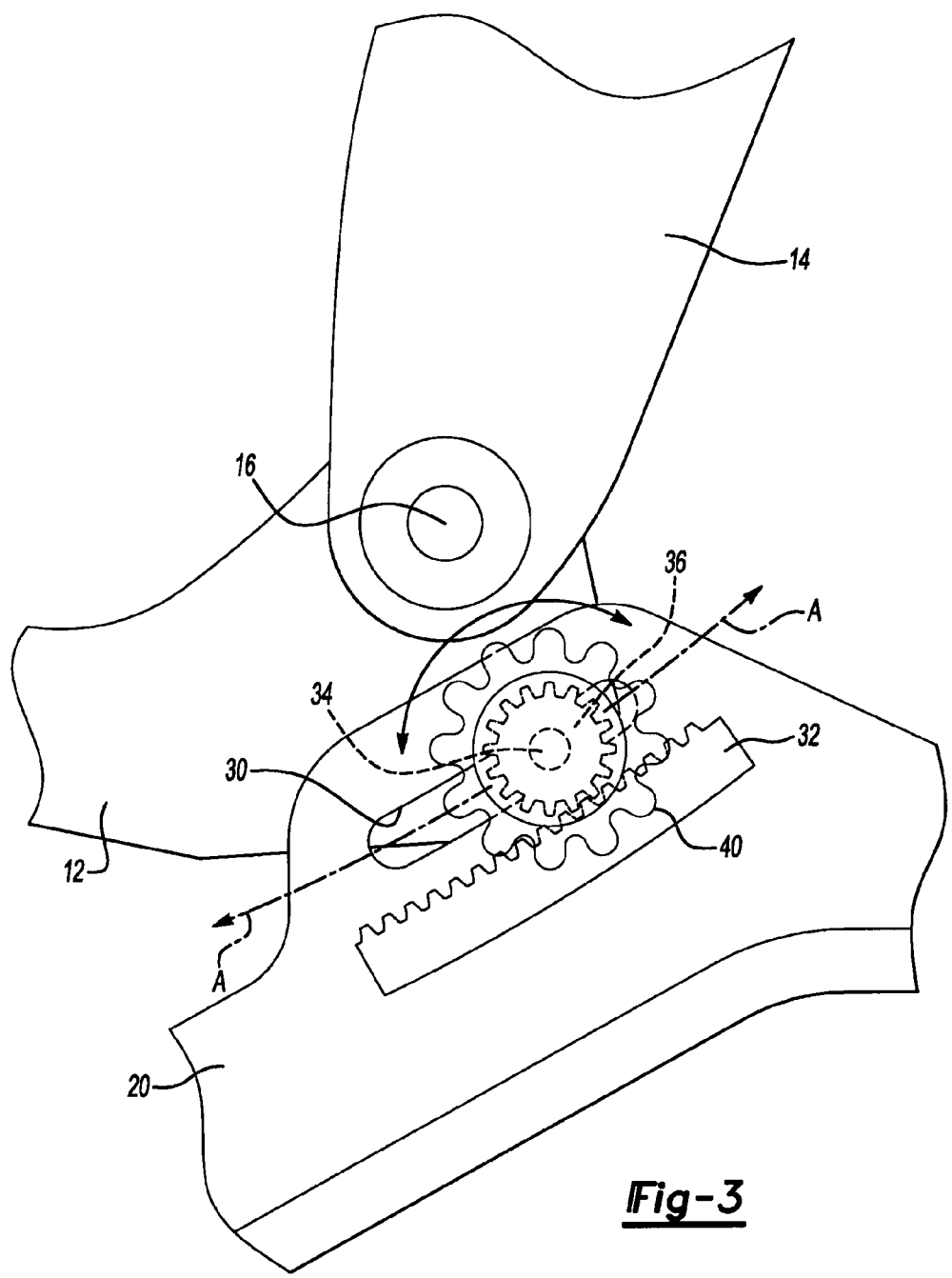
FIG. 3 is a detailed schematic view of a rack and pinion adjustment mechanism for a seat assembly.

As seen in FIG. 3, the seat recline angle α may be adjusted by rotating pinion 36 so that it travels along rack 32. This may be accomplished manually by, for example, turning knob 40 to rotate pinion 36. Alternatively or in addition to manual adjustment, a motorized drive unit and related control system (not shown) may be provided to rotate 36.

Figure 4:
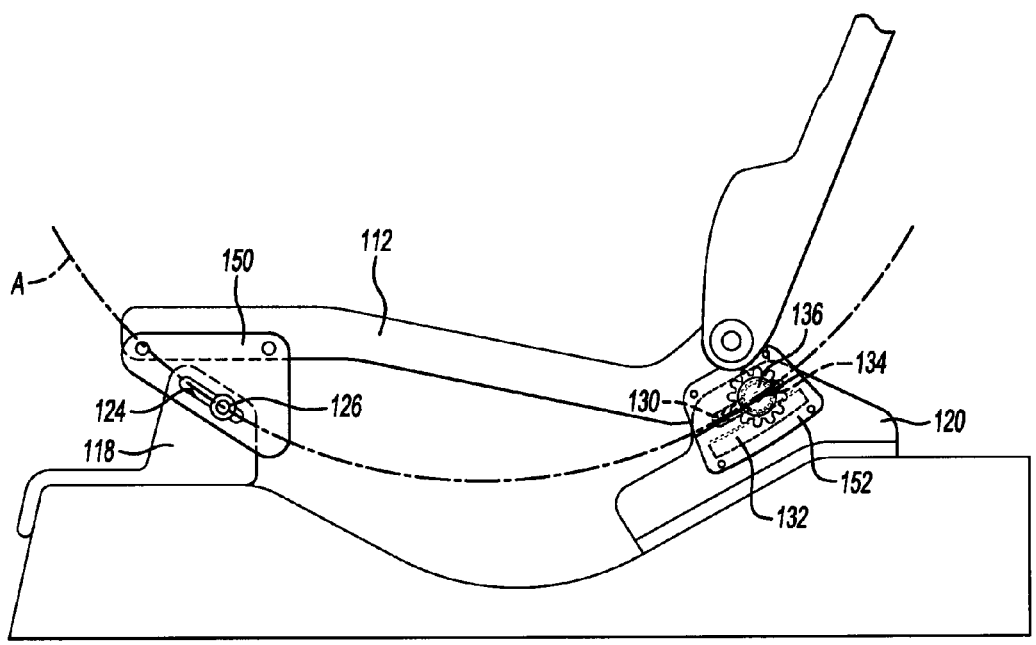
FIG. 4 is a partial schematic view of a second embodiment of an adjustable seat assembly.

It will be apparent to a person of average skill in the art that the rocking or rotating motion of seat assembly 10 about center-of-curvature 38 may be achieved by any number of alternatives to the mechanism disclosed in FIGS. 1-3. For example, one or more of the arcuate paths may be fixed relative to a seat bottom. As seen in FIG. 4, a forward track plate 150 is secured to a seat bottom 112 adjacent a forward edge thereof, and a rear track plate 152 is secured to the seat bottom 112 adjacent a rear edge thereof. A forward guide track 124 is formed by the forward track plate 150 to define a first arcuate path, and a rear guide track 130 is formed by the rear track plate 152 to define a second arcuate path. A rack 132 is also supported by rear track plate 152. A forward follower 126 is supported by forward bracket 118 and engages forward guide track 134, and a rear follower 134 is supported by rear bracket 120 and engages rear guide track 130. A pinion gear 136 may also be provides and engages rack 132.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A vehicle seat assembly comprising:
   a seat bottom having forward and rear edges;
   a mounting structure for securing the seat bottom to a vehicle interior and engaging the seat bottom, the mounting structure having a forward guide track defining a first arcuate path, a forward follower engaging the forward guide track to permit movement of the forward edge along the first arcuate path, a rear guide track defining a second arcuate path, and a rear follower engaging the rear guide track to permit movement of the rear edge along the second arcuate path, the first and second arcuate paths following a common arc having a center-of-curvature located above the seat bottom;
   a rack associated with at least one of the guide tracks and a pinion engaging the rack, rotation of the pinion causing the followers to move along the respective guide tracks; and
   a seat back attached to the seat bottom for rotation about an axis adjacent the seat bottom rear edge.

2. The vehicle seat assembly according to claim 1 wherein the pinion is manually rotatable by a seat occupant.

3. The vehicle seat assembly according to claim 1 wherein the common center-of-curvature of the arcuate paths is above a seating reference position of the seat assembly.

4. The vehicle seat assembly according to claim 1 further comprising a rotatable link between the seat bottom forward edge and the mounting structure permitting the seat bottom to tilt to a stowed position.

5. The vehicle seat assembly according to claim 1 wherein the forward and rear guide tracks are formed in at least one seat mounting bracket for securing the seat assembly to the vehicle interior, and the forward and rear followers are attached to the seat bottom.

6. The vehicle seat assembly according to claim 5 wherein the at least one seat mounting bracket comprises:
   a forward seat mounting bracket comprising the forward guide track; and
   a rear seat mounting bracket comprising the rear guide track.

7. A vehicle seat assembly comprising:
   a seat bottom having a forward edge and a rear edge;
   a mounting structure comprising a forward guide track adjacent to the forward edge and a rear guide track adjacent to the rear edge, the two guide tracks defining arcuate paths following a common arc having a center-of-curvature located above the seat bottom, the seat bottom supported by the two guide tracks and movable relative thereto along the arc; and
   a rotatable link between the seat bottom forward edge and the mounting structure permitting the seat bottom to tilt to a stowed position.

8. The vehicle seat assembly according to claim 7 wherein the mounting structure comprises separate forward and rear portions defining the forward and rear guide tracks respectively.

9. The vehicle seat assembly according to claim 7 further comprising a rack and pinion assembly associated with at least one of the guide tracks, movement of the pinion along the rack causing the seat bottom to move relative to the guide tracks.

10. The vehicle seat assembly according to claim 7 wherein the center-of-curvature of the arcuate paths is above a seating reference position of the seat assembly.

11. The vehicle seat assembly according to claim 7 further comprising a seat back attached to and movable relative to the seat bottom about a pivot axis adjacent the rear edge of the seat bottom.

12. The vehicle seat assembly according to claim 7 further comprising:
   a forward follower attached to the seat bottom adjacent the forward edge and engaging the forward guide track for movement there along; and
   a rear follower attached to the seat bottom adjacent the rear edge and engaging the rear guide track for movement there along.

13. The vehicle seat assembly according to claim 12 further comprising a pinion associated with at least one of the followers.

14. The vehicle seat assembly according to claim 13 wherein the pinion is manually rotatable.

15. A vehicle seat assembly comprising:
   a seat bottom having a forward edge and a rear edge;
   a seat back attached to the seat bottom for rotation about an axis adjacent the seat bottom rear edge;
   seat mounting structure for securing the seat bottom to a vehicle interior, the mounting structure comprising a forward guide track defining a first arcuate path and a rear guide track defining a second arcuate path;
   a forward follower attached to the seat bottom adjacent to the forward edge and engaging the forward guide track for movement there along;
   a rear follower attached to the seat bottom adjacent the rear edge and engaging the rear guide track for movement there along, the first and second arcuate paths extend along and are defined by a common arc having a center-of-curvature located above the seat bottom; and
   a rack and pinion assembly associated with at least one of the guide tracks, movement of the pinion along the rack causing the followers to move along the respective guide tracks.

16. The vehicle seat assembly according to claim 15 further comprising a rotatable link between the seat bottom forward edge and the mounting structure permitting the seat bottom to tilt to a stowed position.

17. A vehicle seat assembly comprising:
   a seat bottom having a forward edge and a rear edge;
   a seat back attached to the seat bottom for rotation about an axis adjacent the seat bottom rear edge;
   seat mounting structure for securing the seat bottom to a vehicle interior, the mounting structure comprising a forward guide track defining a first arcuate path and a rear guide track defining a second arcuate path;
   a forward follower attached to the seat bottom adjacent to the forward edge and engaging the forward guide track for movement there along;
   a rear follower attached to the seat bottom adjacent the rear edge and engaging the rear guide track for movement there along, the first and second arcuate paths extend along and are defined by a common arc having a center-of-curvature located above the seat bottom; and
   a rotatable link between the seat bottom forward edge and the mounting structure permitting the seat bottom to tilt to a stowed position.

18. The vehicle seat assembly according to claim 17 further comprising a rack and pinion assembly associated with at least one of the guide tracks, movement of the pinion along the rack causing the followers to move along the respective guide tracks.

* * * * *